Jan. 5, 1926.  
D. D. PEEBLES  
SEPARATOR  
Filed April 30, 1923  
1,568,413

INVENTOR  
DAVID D. PEEBLES.  
BY Deivy, Strong, Townsend and Loftus  
ATTORNEYS.

Patented Jan. 5, 1926.

1,568,413

UNITED STATES PATENT OFFICE.

DAVID D. PEEBLES, OF EUREKA, CALIFORNIA.

SEPARATOR.

Application filed April 30, 1923. Serial No. 635,447.

*To all whom it may concern:*

Be it known that I, DAVID D. PEEBLES, a citizen of the United States, residing at Eureka, county of Humboldt, and State of California, have invented new and useful Improvements in a Separator, of which the following is a specification.

This invention relates to steam separators and the like, and especially to that type known as entrainment traps.

A great variety of separators, entrainment traps, etc., are employed today, but satisfactory or efficient results are in most cases not obtainable. For instance in certain types, excess back pressure is developed, due to continual change in direction of flow by a series of baffles. Other types are easily flooded when an excess amount of moisture is carried by the vapor. Again, in other types, while an efficient separation is obtained, it is found that a certain percentage of the liquid is picked up and re-incorporated with the outflowing vapor, thus defeating the object sought.

The above enumerated difficulties are met in ordinary steam plants and the like, but other problems and greater difficulties are encountered when milk and liquids having a tendency to foam are evaporated under a high vacuum. These problems may be stated as follows:

First, higher velocities are encountered; second, a larger portion of liquid is carried over by entrainment; third, the physical condition of the liquid carried by entrainment is such as to materially increase the difficulty of separation, and fourth, back pressure must be reduced to a negligible factor if thermal-efficiency is to be considered and low temperature evaporation maintained.

In certain milk evaporating plants which have come under my observation, and where the best obtainable separators have been employed, the entrainment losses run as high as three to four per cent. In plants concentrating other liquids, such as tannin liquor, obtained from California oak bark, the entrainment losses are much higher as the foaming tendency is greater.

The object of the present invention is to generally improve and simplify steam separators, and especially that type which is known as entrainment traps; to provide a trap of small dimensions, which will permit high vapor velocity and reduce back pressure to a minimum; a trap in which separation is effected by impingement action, centrifugal action, friction and gravity, and further a trap in which flooding is entirely eliminated, and which is readily accessible for cleaning, inspection, repairs, etc. Other objects will hereinafter appear.

One form which my invention may assume is exemplified in the following description and illustrated in the accompanying drawings, in which—

Figure 1:
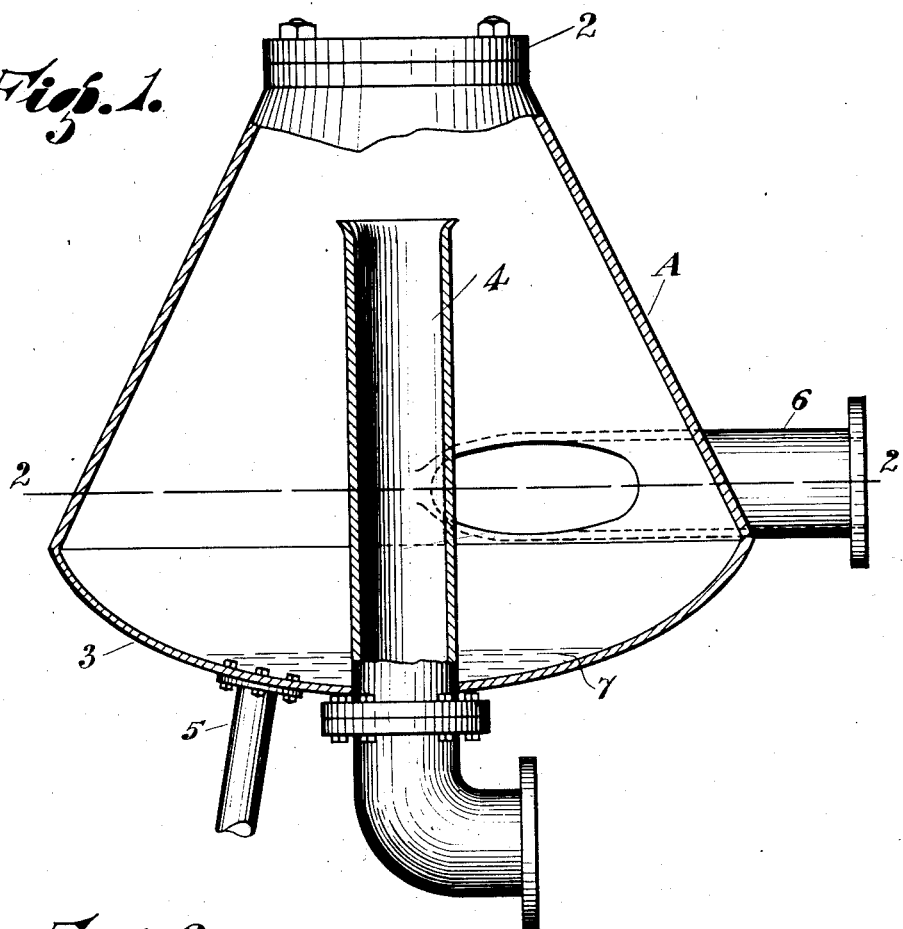
Fig. 1 is a central, vertical, longitudinal section taken through the entrainment trap.
Figure 2:
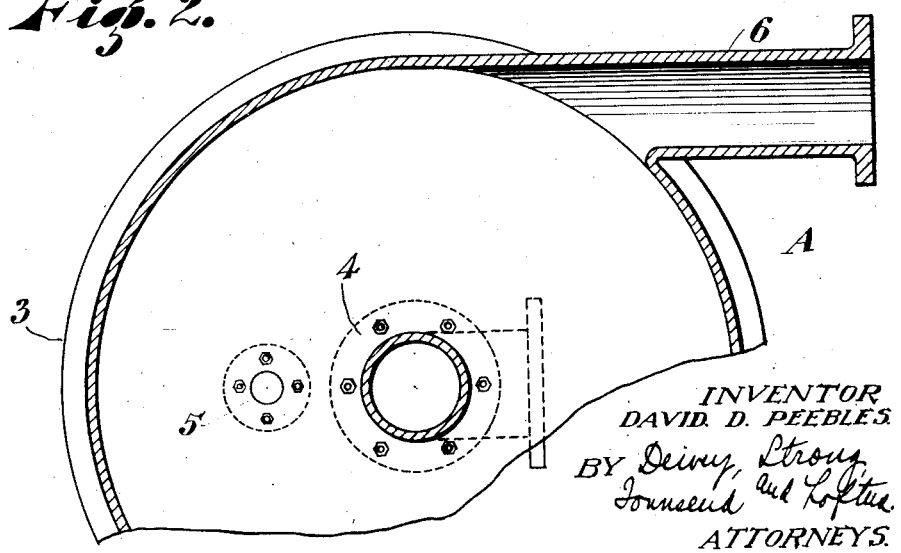
Fig. 2 is a cross section taken on line 2—2, Fig. 1.

Referring to the drawings in detail, and particularly to Fig. 1, A indicates a cone shaped casing provided with a removable cover section 2, and a bottom section 3. The cover is arranged at the upper or smallest end of the cone, and conversely the bottom section is arranged at the lower or largest end of the cone. Extending through the bottom portion of the cone is a vapor discharge pipe 4. This pipe is centrally positioned and extends upwardly into the smaller end of the cone. Connected with the bottom section of the cone, as indicated at 5, is a liquid discharge duct or pipe, and connected with one side of the cone or formed integral therewith, as shown in Fig. 2 is an inlet pipe 6. This pipe is positioned near the lower or largest end of the cone and should, under all circumstances, be positioned at a point below the upper end of the central discharge pipe 4. The entrainment trap may be employed in a variety of plants, but is especially intended for use where liquids are evaporated, and where so-called entrainment losses are encountered. For instance if employed in a milk evaporating plant, where the milk is evaporated under a high vacuum, it would only be necessary to connect the inlet pipe 6 with the vapor discharge pipe of the evaporator and to connect the discharge pipe 4 of the entrainment trap with a condenser or vacuum pump not here shown. Milk under certain conditions has a great tendency to foam. This foam is mechanically elevated by the water vapors liberated and as such is carried with the vapors through the discharge pipe of the evaporator. The vapors containing the foaming milk and entering the trap shown in Fig. 1, are travelling at a high velocity, very often in excess of 800 feet per second. The pipe 6 is arranged on a tangent and as such imparts a swirling movement to the vapors. This swirling movement produces a centrifugal action, which throws the foaming milk particles, which enter in the form of bubbles, outwardly against the tapering walls of the cone shaped casing and they are here broken up by impingement and friction action. The milk or liquid thus liberated is further acted upon by the centrifugal action and will, due to the tapering effect produced by the cone shaped casing, travel in a downward direction and collect in the bottom of the trap as indicated at 7. The milk thus separated or liberated from the water vapors is drained off through the pipe 5 and may be returned to the evaporator in the usual manner. The vapors freed of the liquid carried by entrainment rise upwardly towards the smaller end of the cone shaped chamber and will then discharge downwardly through the flaring upper end of the tube 4 and are conducted to the condenser or whatever apparatus may be employed. Certain liquids, such as tannin liquor, obtained from California oak bark, have even a greater tendency to foam than milk. This foam, in the form of bubbles, is carried off with the vapors liberated and is so light that the average trap or separator employed will not detain the same. In actual practice I have found that the swirling movement set up by the rapidly entering vapors is so great that the bubbles are broken up by impingement against the tapering sides of the casing, and further that the centrifugal action is so great that any bubbles not broken will adhere to the tapering walls and as such will of necessity travel in a downward direction and are gradually broken by friction. They cannot travel upwardly, due to this tapering structure, and as such will necessarily disintegrate and collect in the bottom of the trap, from where they may be removed in the form of liquid in any suitable manner.

The separator works on the cyclone principle and actual practice has proven that no perceptible back pressure is developed. This is important as it is readily seen that any resistance offered the vapors leaving an evaporator tends to increase the pressure within the evaporator, thus greatly reducing its capacity and also increasing the temperature at which evaporation takes place. Separators constructed on this principle can be small in size for a given capacity, thus offering a small area for condensation losses. Temperature drops, condensation losses and back pressures are all detrimental to thermal-efficiency, maintenance of vacuum, and the temperature under which evaporation takes place, and as the causes controlling these factors are favorable in the structure shown, it is obvious that high all-around efficiency is obtainable. Actual practice has shown that entrainment losses when handling milk are so small as to be imperceptible. The removable cover section 2 is also an important feature as a trap of this character must be cleaned at least once a day and sterilized, particularly when handling milk. The removable cover renders the trap accessible for cleaning, inspection and repairs, and this is therefore an added feature of advantage.

While the discharge pipe is in this instance directed downwardly through the bottom portion of the trap, it is obvious that it will operate with equal efficiency if extended through the cover portion or upper end, but it is preferably arranged or passed through the bottom section as it then leaves the cover free for removal as previously described. I also wish it understood that various changes in form and proportion may be resorted to within the scope of the appended claim, similarly that the materials and finish of the several parts employed may be such as the experience and judgment of the manufacturer may dictate or various uses may demand.

Having thus described my invention, what I claim, and desire to secure by Letters Patent is—

An entrainment trap comprising a vertically disposed cone shaped casing, a removable cover member disposed on the upper and small end of the cone, a tapering bottom section secured on the lower and large end of the cone, a vapor discharge pipe centrally disposed with relation to the bottom section and extending upwardly through the bottom section into the interior of the cone, the upper end of said vapor discharge pipe being flared and being in communication with the upper small end of the cone, a vapor inlet pipe connected to the side of the cone at a point intermediate the bottom section and the upper end of the vapor discharge pipe, and disposed on a tangent with relation to the cone, and a liquid discharge pipe connected with the bottom section of the cone.

DAVID D. PEEBLES.